US012439460B2

United States Patent
Wang et al.

(10) Patent No.: US 12,439,460 B2
(45) Date of Patent: Oct. 7, 2025

(54) DATA TRANSMISSION METHOD AND DEVICE

(71) Applicant: Lenovo (Beijing) Limited, Beijing (CN)

(72) Inventors: Jianfeng Wang, Beijing (CN); Jing Han, Beijing (CN); Haipeng Lei, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 737 days.

(21) Appl. No.: 17/685,231

(22) Filed: Mar. 2, 2022

(65) Prior Publication Data

US 2022/0408499 A1 Dec. 22, 2022

(30) Foreign Application Priority Data

Jun. 22, 2021 (CN) .......................... 202110691967.9

(51) Int. Cl.
*H04W 76/10* (2018.01)
*H04W 4/12* (2009.01)
*H04W 12/06* (2021.01)
*H04W 24/10* (2009.01)

(52) U.S. Cl.
CPC ............. *H04W 76/10* (2018.02); *H04W 4/12* (2013.01); *H04W 12/06* (2013.01); *H04W 24/10* (2013.01)

(58) Field of Classification Search
CPC ..... H04W 76/10; H04W 12/06; H04W 24/10; H04W 4/12
See application file for complete search history.

(56) References Cited

U.S. PATENT DOCUMENTS

| 2009/0100261 | A1  | 4/2009 | Aoshima |
| 2011/0119489 | A1* | 5/2011 | Garcia Morchon .. H04L 63/062 713/169 |
| 2021/0084555 | A1* | 3/2021 | Feng ..................... H04W 76/14 |
| 2021/0105788 | A1* | 4/2021 | Kim .................... H04L 41/0869 |

(Continued)

FOREIGN PATENT DOCUMENTS

| CN | 101796796 A | 8/2010 |
| CN | 102316086 A | 1/2012 |
| CN | 107615872 A | 1/2018 |

(Continued)

OTHER PUBLICATIONS

The Intellectual Property Office of the United Kingdom Search Report and Written Opinion for GB2205376.3 Dec. 15, 2022.

*Primary Examiner* — Kent Krueger
(74) *Attorney, Agent, or Firm* — ANOVA LAW GROUP, PLLC

(57) ABSTRACT

The present disclosure provides a data transmission method applied to a first node. The method includes sending a first request for transferring a data transmission to a management node, the first request being generated based on to-be-transmitted data; receiving physical layer information sent by the management node in response to the first request, and obtaining an authority to perform the data transmission with a second node, the physical layer information being used to establish a connection with the second node; and transmitting the to-be-transmitted data to the second node based on the authority.

18 Claims, 9 Drawing Sheets

(56) References Cited

U.S. PATENT DOCUMENTS

2021/0345313 A1\* 11/2021 Basu Mallick ....... H04L 1/1825
2023/0164813 A1\* 5/2023 Guo .................. H04W 52/0212
370/311

FOREIGN PATENT DOCUMENTS

| WO | 2017166115 A1 | 10/2017 |
| WO | 2020151654 A1 | 7/2020 |
| WO | 2021086051 A1 | 5/2021 |

\* cited by examiner

DATA TRANSMISSION METHOD AND DEVICE

CROSS-REFERENCES TO RELATED APPLICATION

This application claims priority to Chinese Patent Application No. 202110691967.9, filed on Jun. 22, 2021, the entire content of which is incorporated herein by reference.

FIELD OF TECHNOLOGY

The present disclosure relates to the field of communication technologies and, more specifically, to a data transmission method and device.

BACKGROUND

In the new short-range wireless communication system, the system management and scheduling nodes are generally used as bridge nodes to realize data transmission between service providing nodes and service receiving nodes. As such, there is a secondary data transmission, which affects the data transmission rate.

BRIEF SUMMARY OF THE DISCLOSURE

One aspect of the present disclosure provides a data transmission method applied to a first node. The method includes sending a first request for transferring a data transmission to a management node, the first request being generated based on to-be-transmitted data; receiving physical layer information sent by the management node in response to the first request, and obtaining an authority to perform the data transmission with a second node, the physical layer information being used to establish a connection with the second node; and transmitting the to-be-transmitted data to the second node based on the authority.

Another aspect of the present disclosure provides a data transmission method applied to a management node. The method includes receiving a first request for transferring a data transmission sent by a first node; generating physical layer information based on the first request, the physical layer information being used to connect the first node to a second node; and sending the physical layer information to the first node for the first node to have a permission to perform the data transmission with the second node.

Another aspect of the present disclosure provides a data processing device applied to a first node. The device includes a first sending module, a first receiving module, and a first transmission module. The first sending module is configured to send a first request for transferring a data transmission to a management node, the first request being generated based on to-be-transmitted data. The first receiving module is configured to receive physical layer information sent by the management node in response to the first request, and obtain an authority to perform the data transmission with a second node, the physical layer information being used to establish a connection with the second node. The first transmission module is configured to transmit the to-be-transmitted data to the second node based on the permission.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Figure 1A:
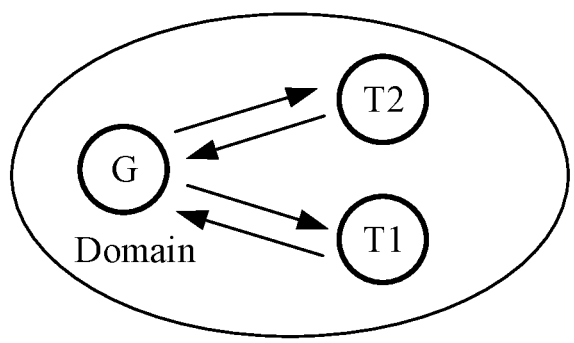
FIG. 1A is a schematic diagram of a network topology in the related art.

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

A person skilled in the art should understand that the phrases "one embodiment" or "an embodiment" referenced in this specification indicate that particular characteristics, structures, or features associated with that embodiment may be incorporated into one embodiment consistent with this disclosure. Therefore, the phrases "in one embodiment" or "in an embodiment" in this specification do not necessarily refer to the same embodiment. In addition, the described characteristics, structures, or features may be incorporated in one or more embodiments in any suitable manner. It should be understood that in various embodiments of the present invention, the sequence numbers of the above various processes or steps do not denote a preferred sequence of performing the processes or steps; and the sequence of performing the processes and steps should be determined according to the functions and internal logics thereof, which shall not cause any limitation to the implementation process of the embodiments of the present invention. The sequential numbers of the embodiments of the present invention are for description purpose only, and they do not denote preference of the embodiments.

Unless otherwise specified, the electronic device can be configured to execute any step in the embodiments of the present disclosure, and the processor of the electronic device may execute the step. The embodiments of the present disclosure do not limit the sequence in which the electronic device executes the following steps. In addition, the method in which data is processed in different embodiments may be the same method or different methods. Further, any step in the embodiments of the present disclosure can be independently executed by the electronic device, that is, when the electronic device executes any step in the following embodiments, it may not depend on the execution of other steps.

In related technologies, with the large-scale commercial deployment of the 5$^{th}$ Generation Mobile Communication Technology (5G), more and more applications and services, such as smart manufacturing, smart home, virtual reality (VR)/augmented reality (AR)/extended reality (XR), and industrial Internet 4.0, etc., require high-speed, low-latency, and high-reliability wireless connections. To meet the wireless communication needs in these emerging scenarios, relevant standardization organizations have established new short-range wireless communication system standards, which are used as the physical layer in the "Starlight 1.0" system to provide the upper layer with basic transmission capabilities that meet business needs. For example, ultra-low latency applications such as active noise reduction and industrial manufacturing can be met by defining ultra-short time slot frame structure and scheduling period; high-reliability application requirements can be met by introducing technologies such as high-performance channel coding, physical layer Hybrid Automatic Repeat reQuest (HARQ) retransmission, and discrete single-subcarrier scheduling; and at the same time, wireless resource scheduling technology can be adopted to improve network resource efficiency, reduce interference and meet the needs of high concurrent communication connections, etc.

FIG. 1A is a schematic diagram of a network topology in the related art. In FIG. 1A, the G node represents the system management and scheduling node, and a set of resources that it can schedule and configure on a carrier is called the communication domain of the node. At the same time, the node can send synchronization signals, broadcast information, control information, and forward data in the corresponding communication domain, and provide management functions such as connection management and resource scheduling between nodes. The T node represents a user terminal node, which can be configured to transmit and receive data based on the data scheduling information. This centralized scheduling management can make more effective use of limited spectrum resources and ensure the reliability and stability of communication. In particular, FIG. 1A shows two user terminal nodes T1 and T2 managed by the system management and scheduling node.

Figure 1B:
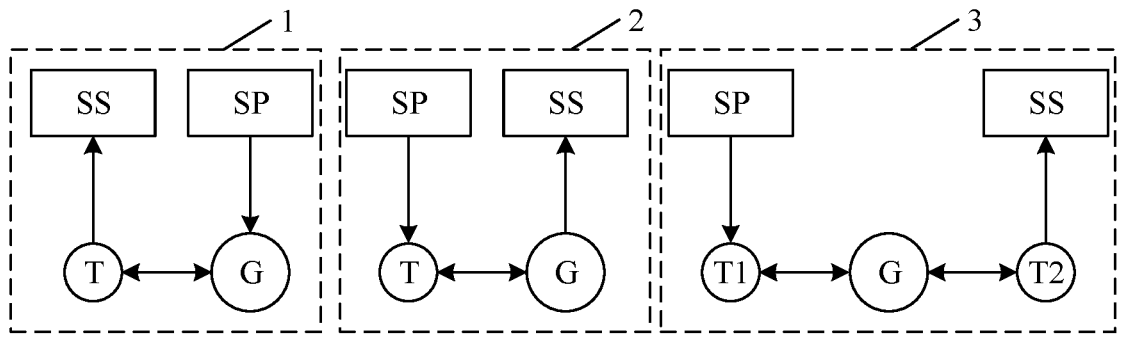
FIG. 1B is a schematic diagram of a wireless network architecture carrying a service function in the related art.

Meanwhile, the upper layer service devices based on this physical layer can be divided into a service receiving node (service subscriber, SS) and a service providing node (service provider, SP). Under certain conditions, such as a service type match, having service provision capability, service quality assurance, and successful authentication, the SS may confirm the service connection to the SP through the above air interface, and transmit service data to provide the requested service. FIG. 1B is a schematic diagram of a wireless network architecture carrying a service function in the related art. As shown in FIG. 1B, there are three bearing relationships between the SS, SP, the "management node" (that is, the G node), and the "device node" (that is, the T node) in the wireless network.

In the first bearing relationship (refer to 1 in FIG. 1B), the SP is located at the G node, and the SS is located at the T node. The typical applications of the first bearing relationship are content distribution services, such as video transmission related to screen projection, and data distribution from the G node as a gateway to device nodes in the network.

In the second bearing relationship (refer to 2 in FIG. 1B), the SP is located at the T node, and the SS is located at the G node. The typical applications of the second bearing relationship are services related to environmental detection. For example, the T node may collect the environment through cameras or radars, and send the collected data to the SS for analysis and processing.

In the third bearing relationship (refer to 3 in FIG. 1B), both the SS and SP are located at the T node, and the G node is used as a bridge node. The typical application of the third bearing relationship is the self-organized network topology, such as the construction of wireless network and provide transmission capability in the vehicle environment.

Figure 2:
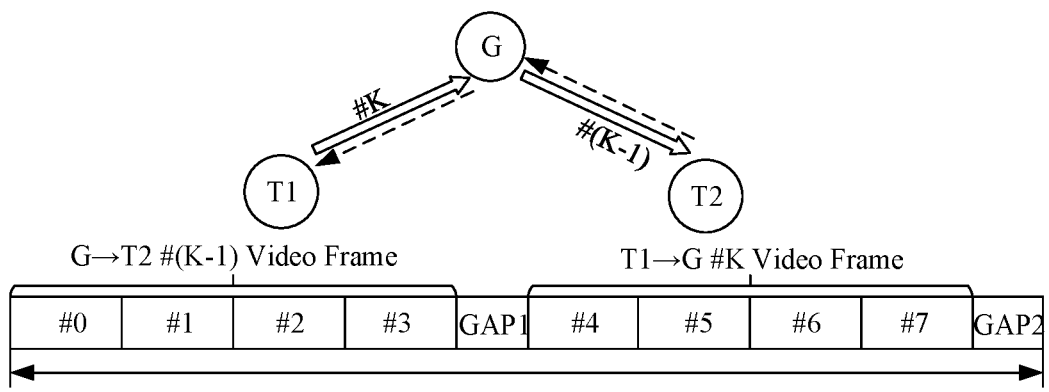
FIG. 2 is a schematic diagram of a configuration of a wireless frame transmitted by a G node as a bridge node in the related art.

In some embodiments, when the G nodes acts as a bridge node, as shown in 3 in FIG. 1B, the SP needs to transfer the data to the SS through the G node. The data first needs to be transmitted from the T1 node as the service provider to the G node for caching, and then sent from the G node to the T2 node at the next time. Take the configuration of the wireless frame structure of the Starlight system as an example. As shown in FIG. 2, which is a schematic diagram of a configuration of the wireless frame transmitted by the G node as a bridge in the related art. In FIG. 2, each wireless frame needs to configure half of the resources (that is, #4 to #7) to the service provider T1, and schedule the current service data (that is, #K data frame) to be sent to the G node for cache. In the same frame, the G node uses the other half of the resources (that is, #0 to #3) to send the last cached fata frame (that is, #K−1 data frame) to the service receiving node T2. Assume that a certain service data transmission requires a total of M physical layer symbol resources, and each wireless frame includes N symbol resources, under the above symmetric resource allocation (that is, half is allocated to T1 to transmit to the G node, and the other half is allocated to the G node to transmit to T2), theoretically, a total of 2*ceil(M/N) wireless frames are required. In addition, resource overheads such as system messages, confirmation of correct reception feedback, and physical layer reference signals also need to be considered within the wireless frame.

As such, in the network topology that requires the G node to perform relay transmission, that is, the bridge node (that is, as shown in 3 in FIG. 1B), there are the following disadvantages.

1. The actual service data transmission rate is low. The same upper layer data is transmitted twice on the air interface (that is, T1 is transmitted to node G, and node G is transmitted to T2), which occupies more transmission resource and actually reduce the transmission rate of service data.

2. There is need to cache data on the management node. In order to support service transmission within the domain, the G node needs more memory for data transfer. The additional memory not only increases the complexity of the device, but also increase the energy consumption of memory read and write.

Figure 3:
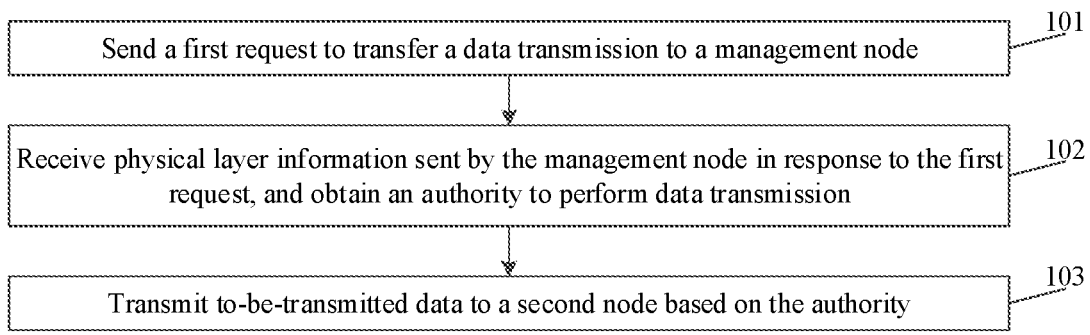
FIG. 3 is a flowchart of a data transmission method applied to a first node according to an embodiment of the present disclosure.

In view of the above, an embodiment of the present disclosure provides a data transmission method, which can be applied to a data transmission device. The data transmission device can be applied to a first node. Referring to FIG. 3, which is a flowchart of the data transmission method applied to the first node according to an embodiment of the present disclosure. The method will be described in detail below.

101, sending a first request to transfer a data transmission to the management node.

In some embodiments, the first request may be generated based on to-be-transmitted data.

In the embodiments of the present disclosure, the first node may be in the same communication domain as the management node. In some embodiments, the first node may be a user terminal node in the communication domain, and configured to send and receive data scheduling information. At the same time, the management node may be a system management and scheduling node in the communication domain, which can be configured to send synchronization signals, broadcast information, control information, and forward data in the communication domain, and can also provide management functions such as connection management and resource scheduling between nodes.

It should be noted that in the communication domain, data transmission between the first node and other nodes may need to be transferred through the management node to transmit data to other nodes.

In some embodiments, the communication between the first node and the management node may be wireless, wired, or via wireless short-distance communication. At the same time, the number of the first nodes may be one, two, or more.

In the embodiments of the present disclosure, the first request may be generated based on the to-be-transmitted data. The to-be-transmitted data may be information composed of a wireless frame, and the data format, data content, and data memory size of the wireless frame are not limited in the embodiments of the present disclosure. At the same time, the first request may be a higher layer signal carrying a request for converting data transmission.

In some embodiments, the to-be-transmitted data may be a video frame.

In some embodiments, the first request for transferring the data transmission may carry one or more of resources required for data transmission, information of a second node receiving the to-be-transmitted data, etc.

In some embodiments, the resources required for data transmission may include service provision duration expected by the first node to perform data transmission, and service quality requirements for data transmission, such as video frame rate and delay requirements, etc.

In some embodiments, the information of the second node receiving the to-be-transmitted data may be attribute information of the second node, a data of the data received by the second node, etc.

102, receiving physical layer information sent by the management node in response to the first request, and obtaining an authority to perform data transmission In some embodiments, the physical layer information may be used to establish a connection with the second node.

In the embodiments of the present disclosure, the first node may receive the physical layer information sent by the management node in response to the first request, and obtain the authority to perform data transmission with the second node. In some embodiments, the first node may analyze the received physical layer information to obtain a corresponding authority, and the authority may be used to perform data transmission with the second node.

In some embodiments, the second node may be a user terminal node in the same communication domain as the first node and the management node. At the same time, the attribute information of the second node may be the same as the first node, and the number of the second node may be one, two, or more.

In some embodiments, the physical layer information may include physical layer reserved resource information, identification information of the second node, and key information.

In some embodiments, the physical layer information may include basic physical layer information required for establishing a physical connection between the first node and the second node, such as the identity document (ID) of the device node, the security key information required for the physical layer connection and the reserve resource information of the physical layer of the communication, such as the communication duration and spectrum resources, etc.

It should be noted that the authority may refer to the scope and extent of decision-making on data transmission that the first node must have in order to ensure the effective performance of the relevant responsibilities of the first node.

103, transmitting the to-be-transmitted data to the second node based on the authority.

In the embodiments of the present disclosure, the first node may directly transmit the to-be-transmitted data to the second node based on the obtained authority. In some embodiments, the first node may establish a transmission channel with the second node based on the obtained authority, and then transmit the to-be-transmitted data to the second node based on the transmission channel with the second node.

In some embodiments, the transmission method of the to-be-transmitted data between the first node and the second node, the data format during transmission, and the transmission duration, etc. may be determined based on the attribute information of the first node, the second node, and the to-be-transmitted data.

It should be noted that the first node may send a request for converting data transmission to the management node, and at the same time obtain the authority with temporary data transmission capability based on the physical layer information sent by the management node in response to the first request to allow the first node to directly transmit data with other nodes as a temporary management node. As such, the transmission efficiency of data can be improved, and the pressure of the management node to transfer and cache the transmission data can be relived.

Consistent with the present disclosure, the data transmission method can be applied to a first node to send a first request for transferring the data transmission to the management node, where the first request may be generated based on the to-be-transmitted data; receive the physical layer information sent by the management node in response to the first request, and obtain the authority to perform data transmission with the second node, where the physical layer information may be used to establish a connection with the second node; and transmit the to-be-transmitted data to the second node based on the authority. By sending a request for transferring the data transmission to the management node, receiving the physical layer information sent by the management node, and obtaining the authority to directly perform data transmission with the second node, the data transmission efficiency can be can be improved, and the additional communication overhead can be reduced.

Figure 4A:
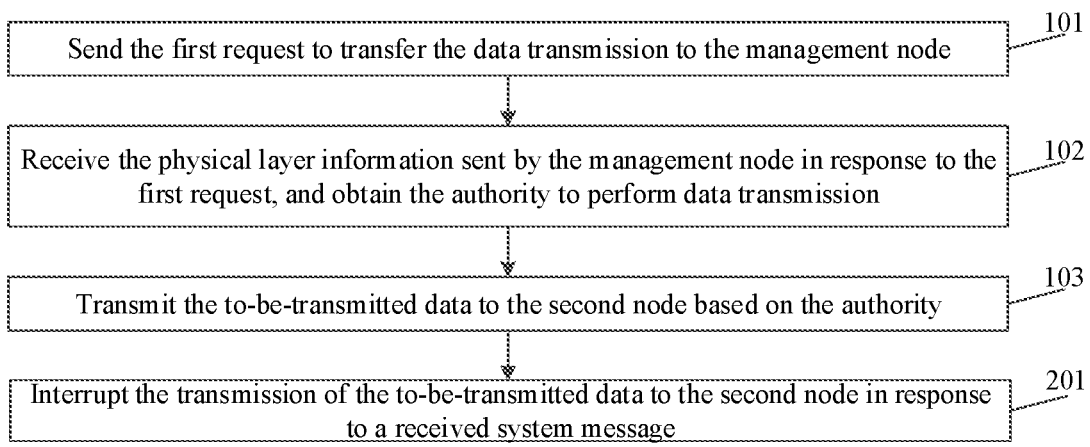
FIG. 4A is a flowchart of another data transmission method applied to the first node according to an embodiment of the present disclosure.
Figure 4B:
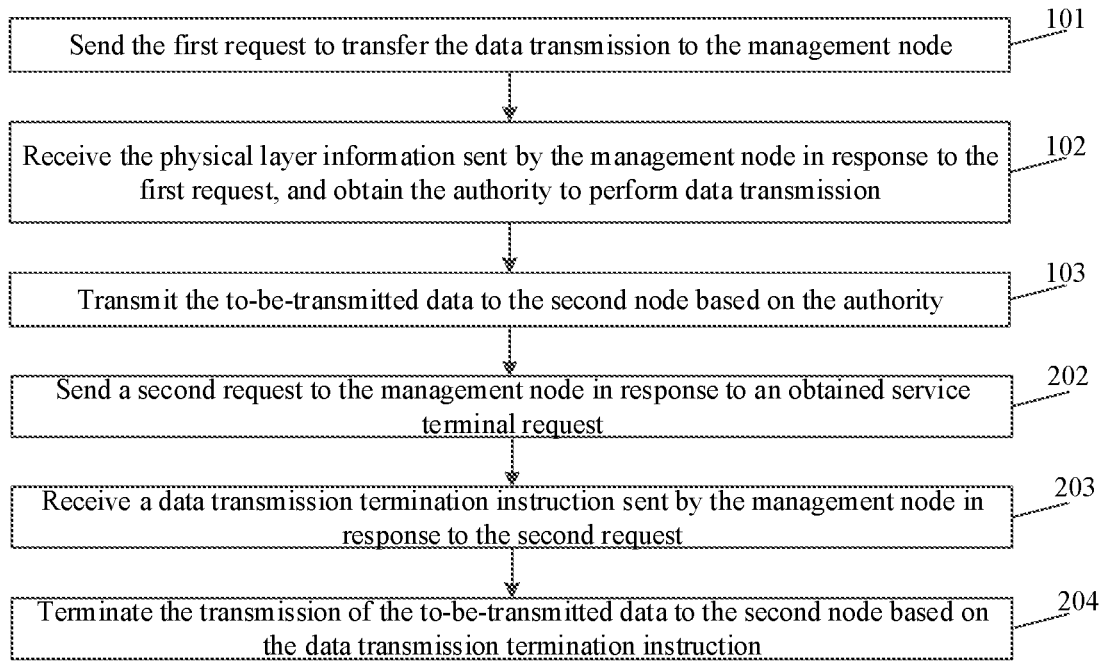
FIG. 4B is a flowchart of another data transmission method applied to the first node according to an embodiment of the present disclosure.

Based on the foregoing embodiment, an embodiment of the present disclosure further provides a data transmission method that can be applied to a data transmission device. The data transmission device can be applied to the first node, as shown in FIG. 3 and FIG. 4 (including FIG. 4A and FIG. 4B that will be described below). The method will be described in detail below.

After the first node transmits the to-be-transmitted data to the second node based on the authority, that is, after the first node performs the process at 103, as shown in FIG. 3 and FIG. 4A, the process at 201 can also be performed.

201, interrupting the transmission of the to-be-transmitted data to the second node in response to a received system message.

In some embodiments, the system message may be a message in the domain where the first node is located.

In the embodiments of the present disclosure, the first node may interrupt the transmission of the to-be-transmitted data to the second node in response to the received system message. In some embodiments, the system message may be broadcast information in the communication domain where the first node is located or a system message corresponding to the communication domain.

In some embodiments, the system message may be a system message sent by any node in the domain where the first node is located, or the system message may be sent by the management node.

In some embodiments, when the first node receives the system message, the transmission of the to-be-transmitted data to the second node may be interrupted at the same time.

In some embodiments, the first node may correspondingly interrupt the transmission of the to-be-transmitted data to the second node in response to the received system message. At the same time, if the first node does not receive any system message, the first node may resume data transmission with the second node.

It should be noted that, in the embodiments of the present disclosure, when the first node receives the system message, the first node may interrupt the data transmission with the second node. As such, data transmission and system broadcast messages between the first node and the second node may be time-division multiplexed, which enables efficient data transmission in the communication domain where the first node, the management node, and the second node are located, thereby improving the efficiency of data transmission between related nodes in the communication domain as a whole.

At the same time, after the first node transmits the to-be-transmitted data to the second node based on the authority, that is, after the first node performs the process at 103, as shown in FIG. 3 and FIG. 4A, processes at 202 to 204 can also be performed.

202, sending a second request to the management node in response to an obtained service terminal request.

In some embodiments, the second request may indicate the termination of the data transmission with the second node In the embodiments of the present disclosure, the first node may generate a second request representing termination of data transmission with the second node in response to the obtained service termination request, and simultaneously send the second request to the management node.

In some embodiments, the service termination request may be determined by the first node based on its own abnormal event, that is, in response to a received abnormal event.

In some embodiments, the service termination request may be the first node receiving a termination request sent by the second node, where the termination request may be generated by the second node in response to receiving an abnormal event, or generated by the information sent to the second node by the management node in response to receiving the abnormal event.

In some embodiments, the service termination request may be the first node receiving a termination request sent by the second node, where the termination request may be generated by the second node in response to receiving the abnormal event and the information sent to the second node by the management node in response to receiving the abnormal event.

203, receiving a data transmission termination instruction sent by the management node in response to the second request.

In the embodiments of the present disclosure, the first node may receive the data transmission termination instruction sent by the management node in response to the second request. In some embodiments, the management node may generate and send the data transmission termination instruction to the first node after receiving the second request.

In some embodiments, the data transmission termination instruction may be used to terminate the data transmission between the first node and the second node.

204, terminating the transmission of the to-be-transmitted data to the second node based on the data transmission termination instruction.

In the embodiments of the present disclosure, the first node may respond to the received data transmission termination instruction and analyze the instruction to terminate the transmission of the to-be-transmitted data to the second node. In some embodiments, the data transmission termination instruction may be to stop the data transmission with the second node, and then to restore the original first node through the transfer of the management node to realize the data transmission with the second node.

It should be noted that, in the embodiments of the present disclosure, in response to the received service termination request, the first node may send a request representing termination of data transmission with the second node to the management node, and terminate the transmission of the to-be-transmitted data to the second node in response to the data transmission termination instruction sent by the management node that matches the second request. As such, in response to the service termination request, the data transmission with the second node can be efficiently terminated, which can effectively reduce the probability of abnormal data transmission due to abnormal events, thereby improving the efficiency of data transmission between related nodes in the communication domain as a whole.

Consistent with the present disclosure, the first node may correspondingly interrupt or terminate the data transmission with the second node in response to the received system message or service termination request during the data transmission process between the first node and the second node based on the authority to perform data transmission with the second node. As such, in the process of data transmission between the first node and the second node without the help of the management node, the corresponding data transmission can be interrupted or terminated based on the system message or the abnormal message, thereby improving the efficiency of data transmission between related nodes in the communication domain as a whole.

Based on the foregoing embodiments, the first node may transmit the to-be-transmitted data to the second node based on the authority, that is, the first node may perform the process at 103, which may also be implemented through the following processes at A1 to A5.

A1, establishing a transmission channel with the second node based on the authority.

In the embodiments of the present disclosure, the first node may establish a transmission channel with the second node based on the authority to transmit data with the second node. In some embodiments, the communication duration and communication method of the transmission channel may be jointly determined based on the attribute information of the first node, the attribute information of the second node, and the attribute information of the to-be-transmitted data.

A2, sending authentication information for measuring the channel quality to the second node based on the transmission channel.

In the embodiments of the present disclosure, through the established transmission channel, the first node may first transmit the authentication information of the relevant transmission channel with the second node, such as sending the authentication information for measuring the quality of the transmission channel to the second node.

In some embodiments, at a specific time after the first node and the second node establish a transmission channel, the first node may send the authentication information for measuring the channel quality to the second node.

In some embodiments, the authentication information for measuring the channel quality may be generated in response to the establishment of the transmission channel.

In other embodiments, the authentication information may be preset by the first node.

It should be noted that the authentication information for measuring the channel quality may be information for measuring the communication quality of the transmission channel between the first node and the second node.

A3, receiving feedback information sent by the second node that matches the authentication information.

In the embodiments of the present disclosure, the first node may receive the feedback information sent by the second node that matches the authentication information. In some embodiments, the feedback information may represent information of the communication quality of the transmission channel between the first node and the second node confirmed by the second node.

In some embodiments, the feedback information may also include a data format of data transmission between the first node and the second node, etc.

A4, adjusting the data transmission format of the to-be-transmitted data based on the feedback information to obtain an adjusted data transmission format.

In the embodiments of the present disclosure, the first node may analyze the feedback information, determine the data format of data transmission between the first node and the second node, and then adjust or convert the data transmission format of the to-be-transmitted data based on the data format to obtain the adjusted data transmission format.

In some embodiments, the data format of the data transmission between the first node and the second node may be the same as, or different from, the adjusted data transmission format.

A5, transmitting the to-be-transmitted data to the second node based on the adjusted data transmission format.

In the embodiments of the present disclosure, the first node may transmit the to-be-transmitted data to the second node in the adjusted data transmission format. In some embodiments, the method of transmitting the to-be-transmitted data to the second node may be a fixed-time transmission or a random transmission.

It should be noted that, in the embodiments of the present disclosure, based on the authority to perform data transmission with the second node, the first node may first establish a transmission channel with the second node, and based on the relevant channel authentication information and feedback information sent between the transmission channel and the second node, the specific data format for data transmission with the second node may be determined. As such, through a more accurate transmission method, the efficiency of data transmission between the first node and the second node in the process of data transmission between the first node and the second node without the help of the management node can be further improved.

Figure 5:
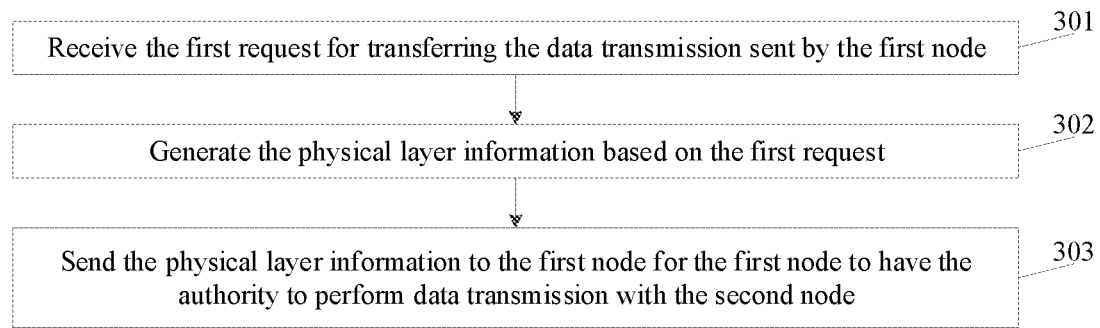
FIG. 5 is a flowchart of the data transmission method applied to a management node according to an embodiment of the present disclosure.

Based on the foregoing embodiments, an embodiment of the present disclosure further provides a data transmission method that can be applied to a data transmission device. The data transmission device can be applied to a management node. FIG. 5 is a flowchart of the data transmission method applied to a management node according to an embodiment of the present disclosure. The method will be described in detail below.

301, receiving a first request for transferring the data transmission sent by the first node.

In the embodiments of the present disclosure, the management node may receive the first request for transferring the data transmission sent by the first node. In some embodiments, the first request may be generated by the first node based on the internal to-be-transmitted data. The first request may carry information such as resources required for data transmission, information of the second node receiving the to-be-transmitted data, etc.

302, generating the physical layer information based on the first request.

In some embodiments, the physical layer information may be used to connect the first node to the second node.

In the embodiments of the present disclosure, the management node may respond to the received first request and analyze the first request to determine whether to agree to the first request. If the management node agrees to the first request, the physical layer information that is sent to the first node may be generated, such that the first node can connect to the second node based on the physical layer information, that is, the first node can perform data communication with the second node. the management node does not agree to the first request, relevant rejection information may be sent. In some embodiments, the rejection information may carry information such as the reason for rejection, for example, the network is busy or the second node does not belong to the nodes managed by the management node, etc.

In some embodiments, the physical layer information may include the physical layer reserved resource information, the identification information of the second node, and the key information.

303, sending the physical layer information to the first node for the first node to have the authority to perform data transmission with the second node.

In the embodiments of the present disclosure, the management node may send the physical layer information to the first node, such that the first node can have the authority to perform data transmission with the second node.

It should be noted that, in the embodiments of the present disclosure, the management node may respond to the first request for transferring the data transmission sent by the first node to authorize the first node to obtain the temporary function of data transmission with the second node. As such, the data transmission efficiency between the first node and the second node can be improved, and additional communication overhead can be reduced at the same time.

In some embodiments, after the management node sends the physical layer information to the first node such that the first node can have the authority to perform data transmission with the second node, that is, after the management node performs the process at 303, the following process at B1 may also be performed.

B1, sending the system message to the first node to interrupt the data transmission between the first node and the second node in response to receiving the system message corresponding to the domain where the management node is located.

In the embodiments of the present disclosure, in response to receiving the system message, the management node may send the system message to the first node, such that when the first node receives the system message, the data transmission with the second node can be interrupted.

In some embodiments, the management node may also send the system message to the second node at the same time. That is, the management node may send system messages to the first node and the second node respectively at the same time, or broadcast messages in the relevant communication domains.

It should be noted that, in the embodiments of the present disclosure, the in the process of data transmission between the first node and the second node without the help of the management node, the management node may simultaneously send relevant system messages to the first node and the second node to interrupt the data transmission between the first node and the second node. That is, the management node only transfers part of the data transmission functions to the first node, and other management functions are not transferred to other nodes. As such, the data transmission in the communication domain where the first node, the management node, and the second node are co-located can be efficiently transferred, and the efficiency of data transmission between related nodes in the communication domain can be improved as a whole.

Consistent with the present disclosure, the management node may respond to the first request for transferring the data transmission sent by the first node to authorize the first node to obtain the temporary function of data transmission with the second node. As such, while improving the data transmission efficiency between the first node and the second node, the pressure of the management node to transfer and cache the transmitted data can also be relived, thereby improving the efficiency of data transmission between related nodes in the communication domain as a whole.

Figure 6:
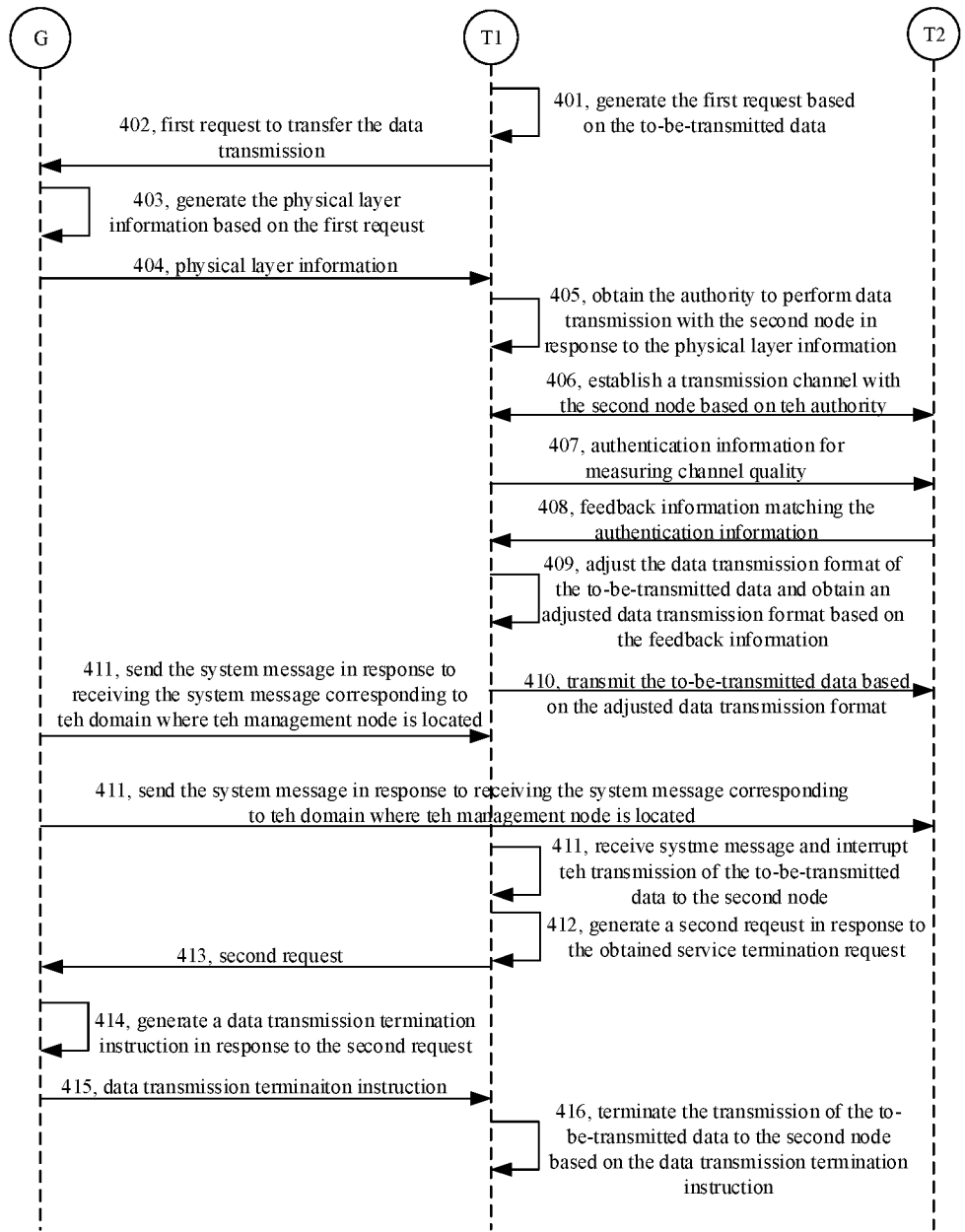
FIG. 6 is a flowchart of interactions between the first node and the management node according to an embodiment of the present disclosure.

FIG. 6 is a flowchart of interactions between the first node and the management node according to an embodiment of the present disclosure. The interactions will be described in detail below.

401, the first node generates a first request based on the to-be-transmitted data.

In the embodiments of the present disclosure, the first node may generate a first request associated with the to-be-transmitted data based on the internal to-be-transmitted data or the received to-be-transmitted data sent by other terminals.

In some embodiments, the to-be-transmitted data may be the data that needs to be sent to the second node.

402, the first node sends the first request for transferring the data transmission to the management node, correspondingly, the management node receives the first request for transferring the data transmission sent by the first node.

403, the management node generates the physical layer information based on the first request.

In some embodiments, the physical layer information may be used to connect the first node to the second node.

404, the management node sends the physical layer information to the first node, such that the first node can have the authority to perform data transmission with the second node.

405, the first node receives the physical layer information sent by the management node in response to the first request, and obtains the authority to perform data transmission with the second node.

In some embodiments, the physical layer information may be used to establish a connection with the second node.

406, the first node establishes a transmission channel with the second node based on the authority.

407, the first node sends the authentication information for measuring the channel quality to the second node based on the transmission channel.

408, the first node receives the feedback information sent by the second node that matches the authentication information.

409, the first node adjusts the data transmission format of the to-be-transmitted data based on the feedback information, and obtains the adjusted data transmission format.

410, the first node transmits the to-be-transmitted data to the second node based on the adjusted data transmission format.

In the embodiments of the present disclosure, by executing the processes of 401 to 410, the data transmission function can be transferred from the management node to the first node.

411, the first node interrupts the transmission of the to-be-transmitted data to the second node in response to a received system message. Correspondingly, in response to receiving the system message corresponding to the domain where the management node is located, the management node may send the system message to the first node to interrupt the data transmission between the first node and the second node.

In some embodiments, the system message may be the message in the domain where the first node is located.

In the embodiments of the present disclosure, the management node may send the system message to the first node, and it may also send the system message to the second node.

412, the first node generates a second request in response to the obtained service termination request.

In some embodiments, the second request may indicate the termination of the data transmission with the second node.

413, the first node sends the second request to the management node.

414, the management node generates a data transmission termination instruction in response to the second request.

415, the management node sends the data transmission termination instruction to the first node; correspondingly, the first node receives the data transmission termination instruction sent by the management node in response to the second request.

416, the first node terminates the transmission of the to-be-transmitted data to the second node based on the data transmission termination instruction.

Based on the processes of 401 to 416, the first node can receive the physical layer information sent by the management node by sending a request for transferring the data transmission to the management node, and then obtain the authority to directly perform data transmission with the second node, thereby improving the efficiency of data transmission and reducing the additional communication overhead. In addition, the first node may interrupt or terminate the data transmission with the second node in response to the received system message or the service termination request after the data transmission between the first node and the second node based on the authority to perform data transmission with the second node. As such, in the process of data transmission between the first node and the second node without the help of the management node, the corresponding data transmission can be interrupted or terminated based on the system message or the abnormal message, thereby improving the efficiency of data transmission between related nodes in the communication domain as a whole.

Figure 7:
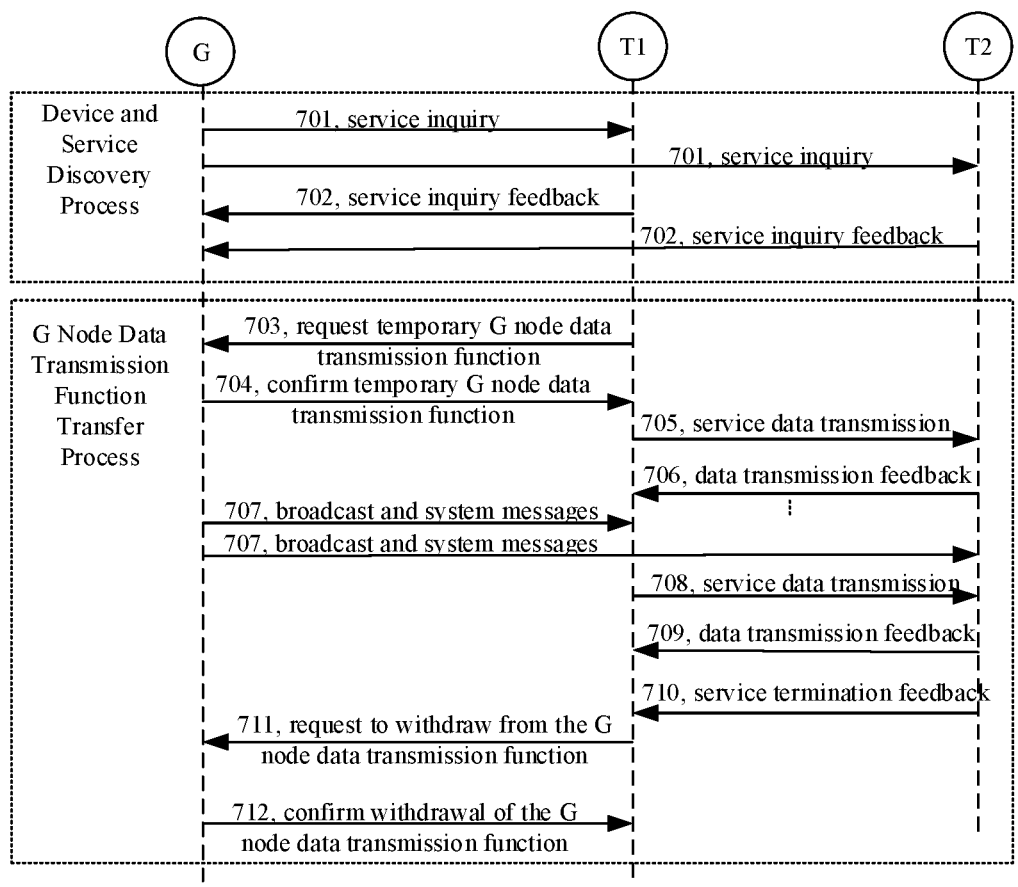
FIG. 7 is a schematic diagram of signal interactions applied to the data transmission method according to an embodiment of the present disclosure.

FIG. 7 is a schematic diagram of signal interactions applied to the data transmission method according to an embodiment of the present disclosure. The communication domain in FIG. 7 includes a management node (that is, the G node), a terminal device node (T1 node), and a terminal device node (T2 node). The T1 node is a service providing node, and the T2 node is a service receiving node. FIG. 7 is divided into two major processes. The first process is the device and service discovery process, and the second process is the transfer process of the G node data transmission function.

The first process may be an existing process in an existing system, and the purpose of which is to discover service-related information and corresponding deices in the communication domain. The service-related information may include the service type, service provision capability, service quality requirements, and authentication content. At the same time, in the first process, the G node may call the basic services and devices discovery functions defined in the protocol layer, and transmit the service query in the communication domain through the underlying physical layer transmission, that is, the process at 701 may be performed to cause the G node to send the service query to the T1 node and the T2 node respectively. Correspondingly, the terminal device nodes in the communication domain, such as the T1 node and the T2 node, may provide the respective data processing capability to the G node after receiving and analyzing the request data packet corresponding to the service query. That is, the process at 702 may be performed for the T1 node and the T2 node to respectively send the service query feedback to the G node. Through the first process, the G node may obtain and store the corresponding service capability information of the T1 node and the T2 node in the communication domain.

The second process may be the T1 node, which may perform the process at 703 spontaneously or under certain conditions to request temporary G node data transmission function to the G node. It should be noted that if the amount of service data that the T1 node needs to transmit is small or is not sensitive to the delay requirements, the normal transmission method may still be maintained, that is, the data transmission may be performed with the T2 node through the G node bridging method. On the contrary, the second process may be triggered to improve transmission efficiency. In the second process, the T1 node may obtain the temporary G node data transmission function by requesting the G node in the communication domain, communicate directly with the T2 node, and restore the data transmission function after the service ends.

At the same time, when executing the process at 703, that is, when the T1 node sends the high-level signal about the G node data transmission function request to the G node, the high-level signal may include the following information.

1. The expected service provision duration, which may refer to the time it takes for the T1 node to complete the requested services, and this duration may be used to assist the G node to determine the actual duration of the data transmission capability authorized to the T1 node.

2. The expected quality of service (QoS) requirements, which may be QoS requirements for the service requested this time, such as the video frame rate, delay requirements, etc. These requirements may be used to assist the G node in determining the transmission resources that can be scheduled to the T1 node, such as the wireless frame configuration, frequency resources, etc.

3. The pre-stored T2 node information, which may be used as an option. In some embodiments, if the T2 node information in the communication domain is known and service will continue to be provided to the T2 node, the information of the T2 node may be added to the request signal for the G node to query and configure the subsequent physical layer information.

At the same time, after the G node receives the application request of the T1 node, the G node may determine whether to accept the service request based on the resource situation in the communication domain, and issue the corresponding information along with the corresponding signal based on the "agree" or "rejected" status. If the status is "agree," the process at 704 may be performed to cause the G node to send the temporary G node data transmission function to the T1 node, that is, the signal may be feedback to confirm the transfer of the temporary data transmission function. The signal may include the following information.

1. The basic physical layer information required to establish a physical connection with the T2 node, such as the device ID.

2. The security key information required to connect to the physical layer of the T2 node.

3. The reserved resources information of the physical layer for communicating with the T2 node, such as duration and spectrum resources.

4. (Optional) Information indicating the difference between the quality of the channel between the T2 node and the G node, and the quality of the T2 node and the G node, and the coding and modulation method used for the initial transmission between the T1 node and the T2 node.

At the same time, if the status is "rejected," the corresponding signal can be sent, and the signal may include the time when the T1 node is recommended to re-initiate the request and the information index of the reason for rejection, such as the network is busy, the T2 node is out of coverage, etc.

After the T1 node obtains the temporary data transmission function, it may start to send service data to the T2 node, that is, the process at 705 can be performed to cause the T1 node to transmit service to the T2 node. In some embodiments, the T1 node may generate control information based on the service data state and the feedback channel quality information of the T2 node to adjust the data transmission format, such as the coding and modulation method.

Correspondingly, the T2 node can receive and feedback information based on the scheduling information, that is, the process at 706 may be performed to cause the T2 node to transmit the feedback data to the T1 node, and at the same time the T2 node may demodulate the service data based on the system message obtained from the G node and the control message obtained from the T1 node. It should be noted that the transfer process of the entire transmission function is transparent to the T2 node, that is, the T2 node can still perform operations such as data reception and demodulation based on the broadcast and system messages in the communication domain and the control information associated with the channel. For example, the T2 node may feedback the corresponding acknowledge character (ACK)/non-acknowledge character (NACK) information based on the results of data packet demodulation and decoding. After the demodulation of the data packet is completed, the ACK/NACK message may be fed back at a specified time, and the T1 node may decide to send a new data packet or retransmit based on the received ACK/NACK. In addition, the T2 node may perform channel measurement based on the reference signal and feedback the channel quality information. The measurement result is for the channel between the T1 node and the T2 node, such that the T1 node can determine the data transmission format, such as the coding and modulation method.

It should be noted that, in the process of data transmission between the T1 node and the T2 node, the G node may monitor at the corresponding time, and demodulate the relevant information to make scheduling-related decisions.

In addition, the G node may continue to send domain broadcast information and system messages as the communication domain control node, that is, the process at 707 may be performed to cause the G node to send the broadcast and system messages to the T1 node and the T2 node respectively. In some embodiments, the system message may include wireless frame structure configuration information, which can be used to update the selected frame structure configuration that supports the enhanced efficient transmission between the T1 node and the T2 node. This configuration should be available in the existing system without the need to modify the air interface standard.

It should be noted that the T1 node may not send data to the T2 node when the G node broadcast message and system message are sent as the communication system data transmission and system broadcast message may be time-multiplexed. That is, the system message may occupy different data symbols for transmission, therefore, the T1 node may not send data to the T2 node when the G node sends the broadcast message. At the same time, the T2 node may continue to receive system messages at the time of broadcast messages and system messages.

After the G node stops the broadcast messages and system messages, the T1 node and the T2 node may resume data transmission, that is, the process at 708 may be performed to cause the T1 node to transmit service data to the T2 node, and the process at 709 may be performed to cause the T2 node to transmit feedback data to the T1 node.

In addition, when there is an emergency and the service needs to be terminated, the relevant node may trigger the service termination information and the corresponding process. For example, in a first situation, when the T2 node needs to terminate the service, it may send the termination request to the T1 node based on the service termination signal provided by the basic service layer, that is, the process at 710 may be performed to cause the T2 node to send the service termination feedback to the T1 node. Correspondingly, based on the signal, the T1 node may no longer communicate with the T2 node (including data transmission and reception), and at the time corresponding to the configured system frame structure, the T1 node may send the "withdraw G node data transmission function request" to the G node. That is, the process at 711 may be performed to cause the T1 node to send a request for existing the data transmission function of the G node to the G node. In a second situation, when the T1 node needs to terminate the service, the T1 node may no longer communicate with the T2 node (including data transmission and reception), and at the transmission time corresponding to the configured system frame structure, the T1 node may send the "withdraw G node data transmission function request" to the G node. That is, the process at 711 may also be performed. In a third situation, when the G node needs to terminate the service, the G node may send the request to the T2 node through a system message, and the T2 node may send the termination service request signal to the T1 node. Subsequently, the T1 node may send the "withdraw G node data transmission function request" to the G node to, that is, the process at 711 may be performed.

It should be noted that the T1 node may send the "withdraw G node data transmission function request" to the G node within a time slot specified by the wireless frame structure indicated in the broadcast message.

Correspondingly, the G node may confirm the "withdrawal of G node data transmission function request" of the T1 node, that is, the process at 712 may be performed to cause the G node to send a signal to the T1 node to confirm the withdrawal of the data transmission function of the G node.

Figure 8A:
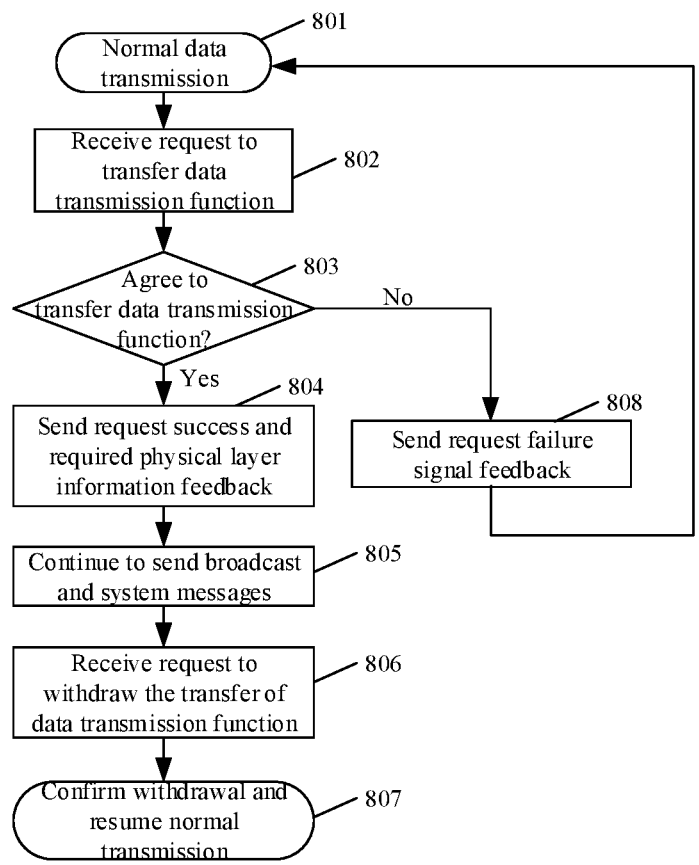
FIG. 8A is a flowchart of the management node processing data transmission function transfer according to an embodiment of the present disclosure.
Figure 8B:
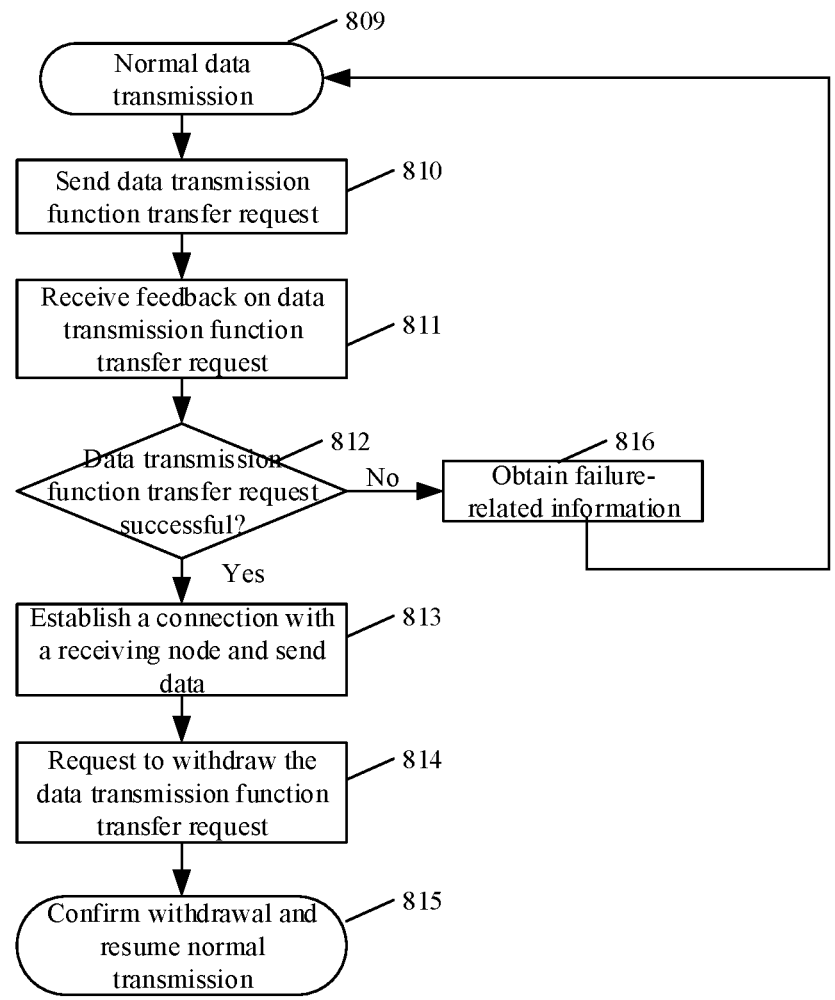
FIG. 8B is a flowchart of the first node processing data transmission function transfer according to an embodiment of the present disclosure.

Based on the processes of 701 to 712, the corresponding processing flows of the G node and the T1 node are respectively shown in FIG. 8A and FIG. 8B. FIG. 8A is a flowchart of the management node processing data transmission function transfer according to an embodiment of the present disclosure. 801 is a normal data transmission of the management node (G node), and 802 is when the G node receives the transfer request of the data transmission function, that is, when the G node receives the transfer request of the data transmission function sent by the T1 node. 803 is to determine whether the transfer of the data transmission function is agreed or rejected. If the transfer of the data transmission function is agreed, the process at 804 may be performed to send the successful request information and feedback the required physical layer information. At the process of 805, as the management node of the communication domain, the management node can continuously send broadcast and system messages. The process at 806 is when the request to withdraw the transfer of the data transmission function is received, and the process at 807 is the confirmation of the withdrawal of the transfer of the data transmission function and the restoration of normal data transmission. In addition, at the process at 803 to determine whether to transfer the data transmission function, if the decision is to reject the data transmission transfer, then the process at 808 may be performed to send a request failure signal and send the signal back to the first node, that is, the T1 node, and return to the normal data transmission process of 801.

Correspondingly, FIG. 8B is a flowchart of the first node processing data transmission function transfer according to an embodiment of the present disclosure. The process at 809 is the normal data transmission of the T1 node; the process at 810 is to send the transfer request of the data transmission function to the management node; and 811 is to receive the request feedback of the transfer of the data transmission function, and analyze the feedback information to determine whether the transfer request of the data transmission is successful, if so, the process at 812 may be performed. Otherwise, the process at 816 may be performed to directly obtain the failure-related information, and then the process at 809 may be performed to resume the normal data transmission process. If the transfer request of the data transmission is successful, the process at 813 may be performed to establish a connection with the receiving node and send data. In case of emergencies, the process at 814 may be performed to withdraw the transfer request of the data transmission function, and the process at 815 may be performed to confirm the withdrawal and resume normal data transmission.

It should be noted that the signal generation methods of the T1 node and the G node may be the same, and the process of signal processing may also be the same. The only difference may be that the G node has more domain management functions. Therefore, by introducing appropriate signaling and processing procedures, the T1 node device may temporarily become the G node, such that it can communicate with the T2 node, thereby achieving the effect of direct connection between the T1 node and the T2 node. On the basis of being fully compatible with the existing physical layer, the transmission efficiency can be improved. In addition, in the foregoing embodiments, the T1 node and the T2 node may also be interchanged.

Figure 9:
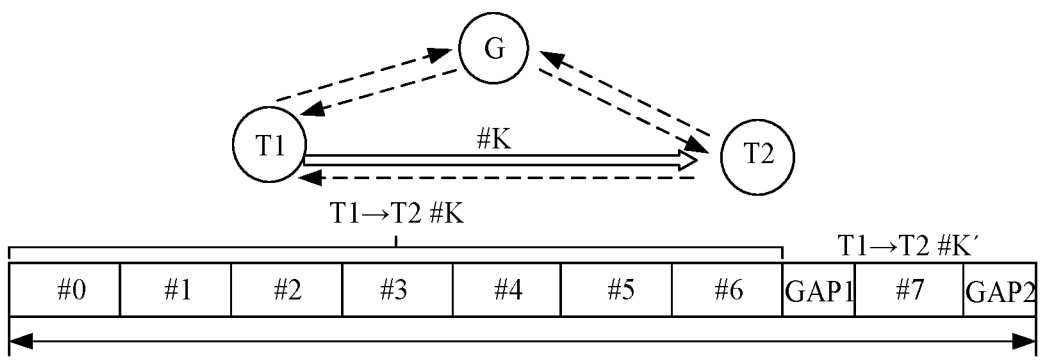
FIG. 9 is a schematic diagram of a configuration of the wireless frame transmitted in the data transmission method according to an embodiment of the present disclosure.

Based on the foregoing embodiments, in the process of data transmission between the T1 node and the T2 node without the help of the management node, the transmitted wireless frame may be configured as shown in FIG. 9. FIG. 9 is a schematic diagram of a configuration of the wireless frame transmitted in the data transmission method according to an embodiment of the present disclosure. In some embodiments, the T1 node and the T2 node may directly transmit data, and most of the resources of each wireless frame transmitted (that is, symbols #0 to #6) may be directly used to transmit data, and symbol #7 of each wireless frame may be used to feed back ACK/NACK and other instructions. As such, assume that a certain service data transmission requires a total of M physical layer symbol resources, and each wireless frame has N symbol resources, only ceil(M/(N−1)) wireless frames can complete the data transmission, such that the transmission speed can nearly double the efficiency. At the same time, as shown in FIG. 9, the G node can continue to act as the communication domain control node to send domain broadcasts and system messages to the T1 node and the T2 node, respectively.

Figure 10:
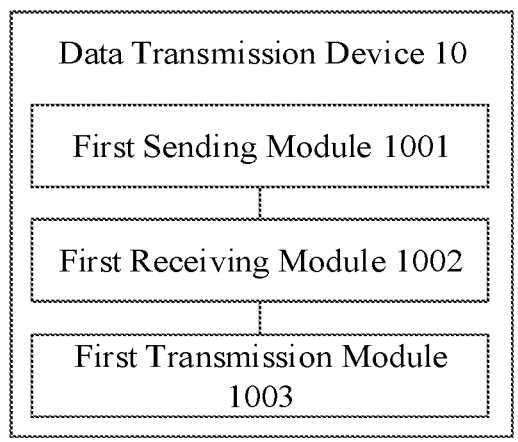
FIG. 10 is a structural diagram of a data transmission device applied to the first node according to an embodiment of the present disclosure.

Based on the foregoing embodiments, an embodiment of the present disclosure further provides a data transmission device 10, which can be applied to the first node. As shown in FIG. 10, the data transmission device 10 includes a first sending module 1001, configured to send a first request for transferring a data transmission to a management node. In some embodiments, the first request may be generated based on the to-be-transmitted data. The data transmission device 10 further includes a first receiving module 1002, configured to receive the physical layer information sent by the management node in response to the first request, and obtain the authority to perform data transmission with the second node. In some embodiments, the physical layer information may be used to establish a connection with the second node. The data transmission device 10 further includes a first transmission module 1003, configured to transmit the to-be-transmitted data to the second node based on the authority.

In other embodiments of the present disclosure, the first request may carry the resources required for data transmission and information of the second node that receives the to-be-transmitted data.

In other embodiments of the present disclosure, the physical layer information may include the physical layer reserved resource information, identification information of the second node, and the key information.

In other embodiments of the present disclosure, the first transmission module 1003 may be further configured to establish a transmission channel with the second node based on the authority, send the authentication information for measuring the channel quality to the second node based on the transmission channel, receive the feedback information sent by the second node that matches the authentication information, adjust the data transmission format of the to-be-transmitted data to obtain the adjusted data transmission format based on the feedback information, and send the to-be-transmitted data to the second node based on the adjusted data transmission format.

In other embodiments of the present disclosure, the data transmission device 10 may further include an interruption module, configured to interrupt the transmission of the to-be-transmitted data to the second node in response to a received system message. In some embodiments, the system message may be a message in the domain where the first node is located.

In other embodiments of the present disclosure, the data transmission device 10 may further include a first termination module, configured to send a second request to the management node in response to an obtained service termination request. In some embodiments, the first request may represent the termination of data transfer with the second node. The first termination module may be further configured to receive a data transmission termination instruction sent by the management node in response to the second request, and terminate the transmission of the to-be-transmitted data to the second node based on the data transmission termination instruction.

It should be noted that for the specific implementation process of the processes performed by each module in this embodiment, reference can be made to the implementation process in the data transmission method provided in the embodiments corresponding to FIG. 3, FIG. 4, and FIG. 6, which will not be repeated here.

Consistent with the present disclosure, the data transmission device can be applied to a first node to send a first request for transferring the data transmission to the management node, where the first request may be generated based on the to-be-transmitted data; receive the physical layer information sent by the management node in response to the first request, and obtain the authority to perform data transmission with the second node, where the physical layer information may be used to establish a connection with the second node; and transmit the to-be-transmitted data to the second node based on the authority. By sending a request for transferring the data transmission to the management node, receiving the physical layer information sent by the management node, and obtaining the authority to directly perform data transmission with the second node, the data transmission efficiency can be can be improved, and the additional communication overhead can be reduced.

Figure 11:
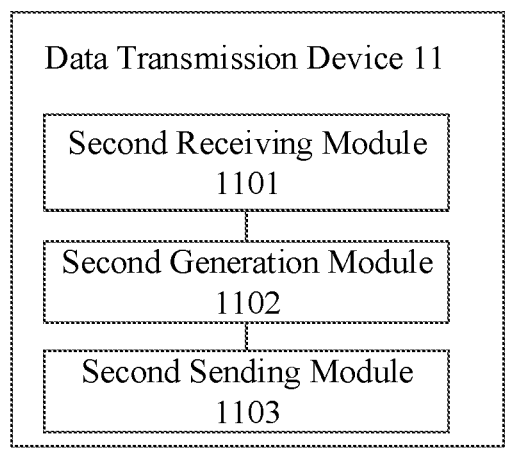
FIG. 11 is a structural diagram of the data transmission device applied to the management node according to an embodiment of the present disclosure.

Based on the foregoing embodiments, an embodiment of the present disclosure further provides a data transmission device 11, which can be applied to the management node. As shown in FIG. 11, the data transmission device 11 includes a second receiving module 1101, configured to receive the first request for transferring the data transmission sent by the second node, and a second generation module 1102, configured to generate the physical layer information based on the first request. In some embodiments, the physical layer information may be used to connect the first node to the second node. The data transmission device 11 further includes a second sending module 1103, configured to send the physical layer information to the first node, such that the first node can have the authority to perform data transmission with the second node.

In other embodiments of the present disclosure, the data transmission device 11 may further include a third sending module, configured to send the system message to the first node in response to receiving the system message corresponding to the domain where the management node is located, thereby interrupting the data transfer between the first node and the second node.

It should be noted that for the specific implementation process of the processes performed by each module in this embodiment, reference can be made to the implementation process in the data transmission method provided in the embodiments corresponding to FIG. 5 and FIG. 6, which will not be repeated here.

Consistent with the present disclosure, the management node may respond to the first request for transferring the data transmission sent by the first node to authorize the first node to obtain the temporary function of data transmission with the second node. As such, while improving the data transmission efficiency between the first node and the second node, the pressure of the management node to transfer and cache the transmitted data can also be relived, thereby improving the efficiency of data transmission between related nodes in the communication domain as a whole.

Figure 12:
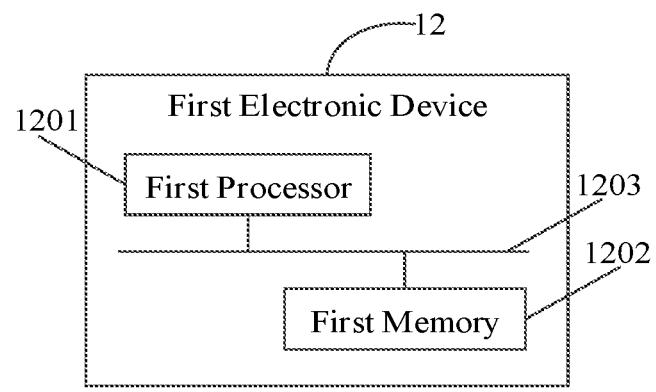
FIG. 12 is a structural diagram of a first electronic device according to an embodiment of the present disclosure.

Based on the foregoing embodiments, an embodiment of the present disclosure further provides a first electronic device 12. The first electronic device 12 can be applied to the data transmission method provided by the embodiments corresponding to FIG. 3, FIG. 4, and FIG. 6. As shown in FIG. 12, the first electronic device 12 includes a first processor 1201, a first memory 1202, and a first communication bus 1203. The first communication bus 1203 may be used to realize the communication connection between the first processor 1201 and the first memory 1202.

The first processor 1201 may be configured to execute the program instructions of the data transmission method stored in the first memory 1202, thereby realizing the data transmission method provided by the embodiments corresponding to FIG. 3, FIG. 4, and FIG. 6.

Consistent with the present disclosure, the first electronic device can be configured to send a first request for transferring the data transmission to the management node, where the first request may be generated based on the to-be-transmitted data; receive the physical layer information sent by the management node in response to the first request, and obtain the authority to perform data transmission with the second node, where the physical layer information may be used to establish a connection with the second node; and transmit the to-be-transmitted data to the second node based on the authority. By sending a request for transferring the data transmission to the management node, receiving the physical layer information sent by the management node, and obtaining the authority to directly perform data transmission with the second node, the data transmission efficiency can be can be improved, and the additional communication overhead can be reduced.

Figure 13:
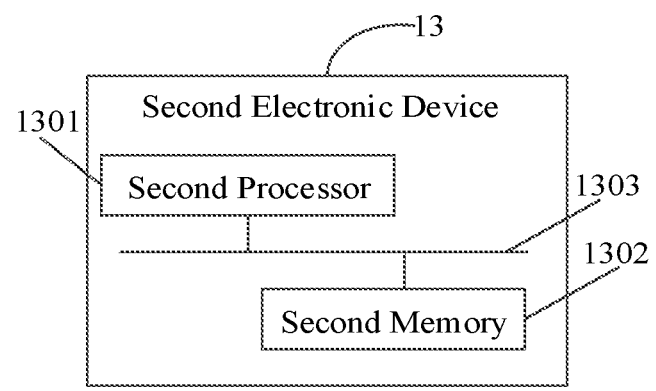
FIG. 13 is a structural diagram of a second electronic device according to an embodiment of the present disclosure.

Based on the foregoing embodiments, an embodiment of the present disclosure further provides a second electronic device 13. The second electronic device 13 can be applied to the data transmission method provided by the embodiments corresponding to FIG. 5 and FIG. 6. As shown in FIG. 13, the second electronic device 13 includes a second processor 1301, a second memory 1302, and a second communication bus 1303. The second communication bus 1303 may be used to realize the communication connection between the second processor 1301 and the second memory 1302.

The second processor 1301 may be configured to execute the program instructions of the data transmission method stored in the second memory 1302, thereby realizing the data transmission method provided by the embodiments corresponding to FIG. 5 and FIG. 6.

Consistent with the present disclosure, the second electronic device may respond to the first request for transferring the data transmission sent by the first node to authorize the first node to obtain the temporary function of data transmission with the second node. As such, while improving the data transmission efficiency between the first node and the second node, the pressure of the management node to transfer and cache the transmitted data can also be relived, thereby improving the efficiency of data transmission between related nodes in the communication domain as a whole.

Based on the foregoing embodiments, an embodiment of the present disclosure further provides a computer-readable storage medium. The computer-readable storage medium may store one or more programs, and the one or more programs can be executed by one or more processors to implement the data transmission method provided by the embodiments corresponding to FIGS. 3 to 6.

It should be noted that the computer-readable storage medium may be a memory such as a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, an optical disk, or a compact disc read-only memory, or an electronic device including one or any combination of the above memories, such as a mobile phone, a computer, a tablet device, a personal digital assistant, etc.

It should be noted that, terms "comprising" and "including" or any other variations thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

The sequence numbers of the embodiments of the present disclosure are merely for ease of description, and do not imply the preference throughout the embodiments.

Through the foregoing description of the embodiments, it is clear to those skilled in the relevant art that the present disclosure may be implemented by software plus a universal hardware platform, and may also be implemented by hardware. An electronic apparatus consistent with the disclosure can include a storage medium (for example, a ROM/RAM, a magnetic disk, or an optical disc) storing instructions, and a processor executing the instructions to perform a method consistent with the disclosure, such as one of the above-described methods. The instructions can also instruct a terminal device (which may be a mobile phone, a computer, a server, or a network device) to perform the method according to the embodiments of the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

The above descriptions are merely example embodiments of the present disclosure, and are not intended to limit the scope of the present disclosure. Any equivalent modification made to the structure or processes based on content of this specification and the accompanying drawings for direct or indirect use in other related technical fields shall all fall within the scope of the present disclosure.

What is claimed is:

1. A data transmission method applied to a first node, comprising:
   sending a first request for transferring a data transmission to a management node, the first request being generated based on to-be-transmitted data;
   receiving physical layer information sent by the management node in response to the first request, and obtaining an authority to perform the data transmission with a second node, the physical layer information being used to establish a connection with the second node, the authority comprising a scope and extent of decision-making on the data transmission that the first node has, the authority allowing the first node to directly transmit data as a temporary management node; and
   transmitting the to-be-transmitted data to the second node based on the authority.

2. The method of claim 1, wherein:
   the first request carries information of resources required for the data transmission, and information of the second node that receives the to-be-transmitted data.

3. The method of claim 1, wherein:
   the physical layer information includes physical layer reserved resource information, identification information of the second node, and key information.

4. The method of claim 1, wherein transmitting the to-be-transmitted data to the second node based on the authority includes:
   establishing a transmission channel with the second node based on the authority;
   sending authentication information for measuring channel quality to the second node based on the transmission channel;
   receiving feedback information sent by the second node that matches the authentication information;
   adjusting a data transmission format of the to-be-transmitted data to obtain an adjusted data transmission format based on the feedback information; and
   sending the to-be-transmitted data to the second node based on the adjusted data transmission format.

5. The method of claim 1 further comprising:
   interrupting the transmission of the to-be-transmitted data to the second node in response to a received system message, the system message being a message in a domain where the first node is located.

6. The method of claim 1 further comprising:
   sending a second request to the management node in response to an obtained service termination request, the second request representing a termination of the data transmission with the second node;
   receiving a data transmission termination instruction sent by the management node in response to the second request; and
   terminating the transmission of the management node to the second node based on the data transmission termination instruction.

7. A data transmission method applied to a management node, comprising:
   receiving a first request for transferring a data transmission sent by a first node;
   generating physical layer information based on the first request, the physical layer information being used to connect the first node to a second node; and
   sending the physical layer information to the first node for the first node to have an authority to perform the data transmission with the second node, the authority comprising a scope and extent of decision-making on the data transmission that the first node has, the authority allowing the first node to directly transmit data as a temporary management node.

8. The method of claim 7, wherein:
   the first request carries information of resources required for the data transmission, and information of the second node that receives to-be-transmitted data.

9. The method of claim 7, wherein in response to receiving the physical layer information from the management, the first node is configured to:
   establish a transmission channel with the second node based on the authority;
   send authentication information for measuring channel quality to the second node based on the transmission channel;

receive feedback information sent by the second node that matches the authentication information;

adjust a data transmission format of the to-be-transmitted data to obtain an adjusted data transmission format based on the feedback information; and send the to-be-transmitted data to the second node based on the adjusted data transmission format.

10. The method of claim 7, wherein:

the physical layer information includes physical layer reserved resource information, identification information of the second node, and key information.

11. The method of claim 7 further comprising:

sending a system message to the first node to interrupt the data transmission between the first node and the second node in response to receiving the system message corresponding to a domain where the management node is located.

12. The method of claim 7, wherein in response to receiving the physical layer information from the management, the first node is further configured to:

send a second request to the management node in response to an obtained service termination request, the second request representing a termination of the data transmission with the second node;

receive a data transmission termination instruction sent by the management node in response to the second request; and terminate the transmission of the management node to the second node based on the data transmission termination instruction.

13. A data processing device applied to a first node, comprising:

a first sending module, the first sending module being configured to send a first request for transferring a data transmission to a management node, the first request being generated based on to-be-transmitted data;

a first receiving module, the first receiving module being configured to receive physical layer information sent by the management node in response to the first request, and obtain an authority to perform the data transmission with a second node, the physical layer information being used to establish a connection with the second node, the authority comprising a scope and extent of decision-making on the data transmission that the first node has, the authority allowing the first node to directly transmit data as a temporary management node; and a first transmission module, the first transmission module being configured to transmit the to-be-transmitted data to the second node based on the permission.

14. The device of claim 13, wherein:

the first request carries information of resources required for the data transmission, and information of the second node that receives the to-be-transmitted data.

15. The device of claim 13, wherein:

the physical layer information includes physical layer reserved resource information, identification information of the second node, and key information.

16. The device of claim 13, wherein the first transmission module is further configured to:

establish a transmission channel with the second node based on the permission;

send authentication information for measuring channel quality to the second node based on the transmission channel;

receive feedback information sent by the second node that matches the authentication information;

adjust a data transmission format of the to-be-transmitted data to obtain an adjusted data transmission format based on the feedback information; and send the to-be-transmitted data to the second node based on the adjusted data transmission format.

17. The device of claim 13 further comprising:

an interruption module, the interruption module being configured to interrupt the transmission of the to-be-transmitted data to the second node in response to a received system message, the system message being a message in a domain where the first node is located.

18. The device of claim 13 further comprising:

a termination module, the termination module being configured to send a second request to the management node in response to an obtained service termination request, the second request representing a termination of the data transmission with the second node;

receive a data transmission termination instruction sent by the management node in response to the second request; and terminate the transmission of the management node to the second node based on the data transmission termination instruction.

* * * * *